US008457311B1

(12) United States Patent
Schultz et al.

(10) Patent No.: US 8,457,311 B1

(45) Date of Patent: Jun. 4, 2013

(54) PROTECTING VIDEO AS IT IS DECODED BY A CODEC

(75) Inventors: Roderick David Schultz, San Francisco, CA (US); Till Uro, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 456 days.

(21) Appl. No.: 12/768,652

(22) Filed: Apr. 27, 2010

(51) Int. Cl.
*H04N 7/167* (2006.01)

(52) U.S. Cl.
USPC ............ 380/210; 380/200; 380/201; 380/217

(58) Field of Classification Search
USPC ............. 380/210, 200, 201, 217; 375/240.14, 375/240.25
See application file for complete search history.

(56) References Cited

U.S. PATENT DOCUMENTS

2003/0038838 A1* 2/2003 Pollitt ........................... 345/741
2008/0291999 A1 11/2008 Lerouge et al.
2010/0020883 A1* 1/2010 Miyauchi et al. ........ 375/240.25
2010/0046631 A1* 2/2010 Raveendran ............. 375/240.25

FOREIGN PATENT DOCUMENTS

EP 1995965 11/2008

* cited by examiner

*Primary Examiner* — Edward Zee
*Assistant Examiner* — Baotran N To
(74) *Attorney, Agent, or Firm* — Wolfe-SBMC

(57) ABSTRACT

In one aspect, a method includes: obtaining compressed video content within a video content processing module, a portion of a document structure of the compressed video content conforming to a predefined codec, the portion of the document structure including a plurality of video frames; decrypting the compressed video content in accordance with a digital rights management data encryption applied to the compressed video content; adding information in an extension frame associated with a portion of the document structure; and applying an encoding technique to content of one or more of the plurality of video frames after the decrypting, wherein the extension frame flags the applied encoding technique; and providing the compressed video content, including the encoded content, to a media player including a codec conforming to the predefined codec.

20 Claims, 8 Drawing Sheets

PROTECTING VIDEO AS IT IS DECODED BY A CODEC

BACKGROUND

This specification relates to operations performed in conjunction with media content rendering.

The Internet is widely used to distribute media content, including video, graphic, audio, and scripting data. Media content can be downloaded as a file, or streamed to a client computer, where a media player application can process and output the media content to a display device and, if applicable, one or more speakers. The media player application or an application including media player functionality, in some examples, can be a program written for a particular operating system (OS) on a computer platform or a "plug-in" based software that runs inside another program, such as a runtime environment, on a computer platform.

Digital Rights Management (DRM) is used to control access to media content. A content provider, copyright holder, or publisher can apply a method of DRM encryption to compressed media content to deter the duplication and redistribution of the media content. DRM encryption is typically added and removed in a well-defined and recognizable manner.

A codec is a software program used to encode or decode media content, such as streamed media content provided to a client computer. The term codec stems from the combination of the terms compressor and decompressor or coder and decoder. There are separate codecs used for audio or video content, as well as combined multimedia codecs. A media player application can include one or more codecs for decompressing media content prior to rendering. Some codec standards include a provision for user-provided data to be included with the compressed media content. For example, the H.264/MPEG-4 Advanced Video Coding (AVC) codec standard, developed jointly by the ITU-T Video Coding Experts Group (VCEG) and the ISO/IEC Moving Picture Experts Group (MPEG), includes Supplemental Enhancement Information (SEI) content blocks which can be used to insert extra information into a compressed media content bit stream. The TrueMotion VP6 video codec standard, developed by On2 Technologies of Clifton Park, N.Y., provides for an arbitrary length control data buffer which can be appended to the end of a set-length video buffer.

Lightweight encoding algorithms require minimal computation and time to apply or reverse. An example of a lightweight encoding algorithm is a substitution box, or S-Box, which applies a linear substitution to discrete sections of data (e.g., bytes or words) based upon entries in a lookup table. Some S-Box implementations include a key which can be used to dynamically generate a substitution table. Rivest Cipher 4, or RC4, is another lightweight encoding algorithm. RC4 generates a keystream, including a pseudorandom stream of bits, which is combined with the source data using bit-wise exclusive-or. The decoding operation is also performed using bit-wise exclusive-or.

SUMMARY

This specification describes technologies relating to operations performed in conjunction with media content rendering.

In general, one innovative aspect of the subject matter described in this specification can be embodied in methods that include obtaining compressed video content within a video content processing module, a portion of a document structure of the compressed video content conforming to a predefined codec, the portion of the document structure including a plurality of video frames; decrypting the compressed video content in accordance with a digital rights management data encryption; adding information in an extension frame associated with a portion of the document structure; applying an encoding technique to content of one or more of the plurality of video frames after the decrypting, wherein the extension frame flags the applied encoding technique; and providing the compressed video content, including the encoded content, to a media player including a codec conforming to the predefined codec. Adding information in an extension frame can include introducing the extension frame into the portion of the document structure. The media player can recognize the extension frame and apply a decoding technique to the compressed video content within a decompression stage based upon the extension frame.

The method can include populating the extension frame with decoding information related to the encoding technique. The decoding information can include a decoding key which can be applied by the media player to decode the encoding technique applied to the compressed video content. Moreover, the decoding information can correspond to a substitution box applied to the one or more of the plurality of video frames.

The encoding technique can be a data scrambling technique. The one or more of the plurality of video frames can be key frames. The predefined codec can conform to a H.263 or H.264 standard, the plurality of video frames can be network abstraction layer (NAL) units, and the extension frame can be a supplemental enhanced information (SEI) NAL unit. The SEI NAL unit can include a universally unique identifier (UUID) known by the media player. The predefined codec can conform to a VP6 standard, the plurality of video frames can be VP6-compliant samples, and the extension frame can be a control buffer appended to the end of a video buffer.

The methods can be implemented using a computer-readable medium encoding a computer program product operable to cause data processing apparatus to perform operations as described. Moreover, one innovative aspect of the subject matter described in this specification can be embodied in systems that include a display device; a computer storage medium; and one or more processors operable to interact with the computer storage medium and the display device and to perform operations including: receiving, at a digital rights management module, encrypted compressed video content, where a portion of the encrypted compressed video content conforms to a predefined video codec having an associated optional property, the portion including a plurality of video frames, and where video content including the optional property is readable by any media player including a codec conforming to the predefined video codec; decrypting the compressed video content; modifying, using a video content processing module, the decrypted compressed video content, where the video content processing module adds information in an extension frame in the portion, applies an encoding technique to content of one or more of the plurality of video frames, and identifies a decoding technique within the extension frame, the decoding technique usable to reverse the applied encoding technique; and identifying, at a media player, the identified decoding technique within the extension frame of the compressed video content, where the media player reverses the encoding technique applied to the compressed video content while decompressing the compressed video content.

The video content processing module can populate the extension frame with decoding information related to the encoding technique. The decoding information can correspond to a substitution box applied to the one or more of the plurality of video frames. Various other details can also be implemented in the system, including having the predefined codec conform to at least one of a H.263 standard, a H.264 standard, and a VP6 standard.

Particular embodiments of the subject matter described in this specification can be implemented so as to realize one or more of the following advantages. DRM-encrypted media content, received at a video content processing module, can be protected from potential attack, upon decrypting, by encoding a compressed video content portion of the media content, the compressed video content portion being formatted to conform to a predefined codec. As used herein, this "encoding" of a compressed video content portion of media content between DRM decryption and decoding by the predefined codec can include use of a lightweight encoding algorithm, a data scrambling algorithm, a block cipher, or a more complex encryption algorithm. Thus, the DRM boundaries can be blurred by adding important content protection decoding operations into a software codec. By embedding the decoding functionality directly within the video codec of a receiving media player, the media player can avoid producing a compressed, decoded version of the encoded video content, thereby continuing to protect the media content from potential attack. A potential attacker may be forced to steal the uncompressed content rather than the compressed content, which can require more storage space and re-encoding of the content before redistribution of the stolen content (along with a potential loss of content quality due to the content being uncompressed and recompressed). Moreover, a potential attacker may be forced to debug the software codec, creating additional difficulties for the potential attacker.

The encoding technique used by the video content processing module can be flagged within a user data extension frame format of the predefined codec, allowing the video content to be parsed by any media player including the predefined codec, although the rendered content will be corrupted absent the use of the decoding techniques described herein. The encoding technique used can be a lightweight data scrambling technique, applied to only a key frame portion of the compressed video content, because the corruption caused by the lightweight data scrambling technique will be expanded to more of the video content through the decompression process. Using a fast encoding technique, such as a lightweight data scrambling technique, allows the media player to quickly decode and decompress the video content without detriment to the end user experience as the media content is rendered to a display device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
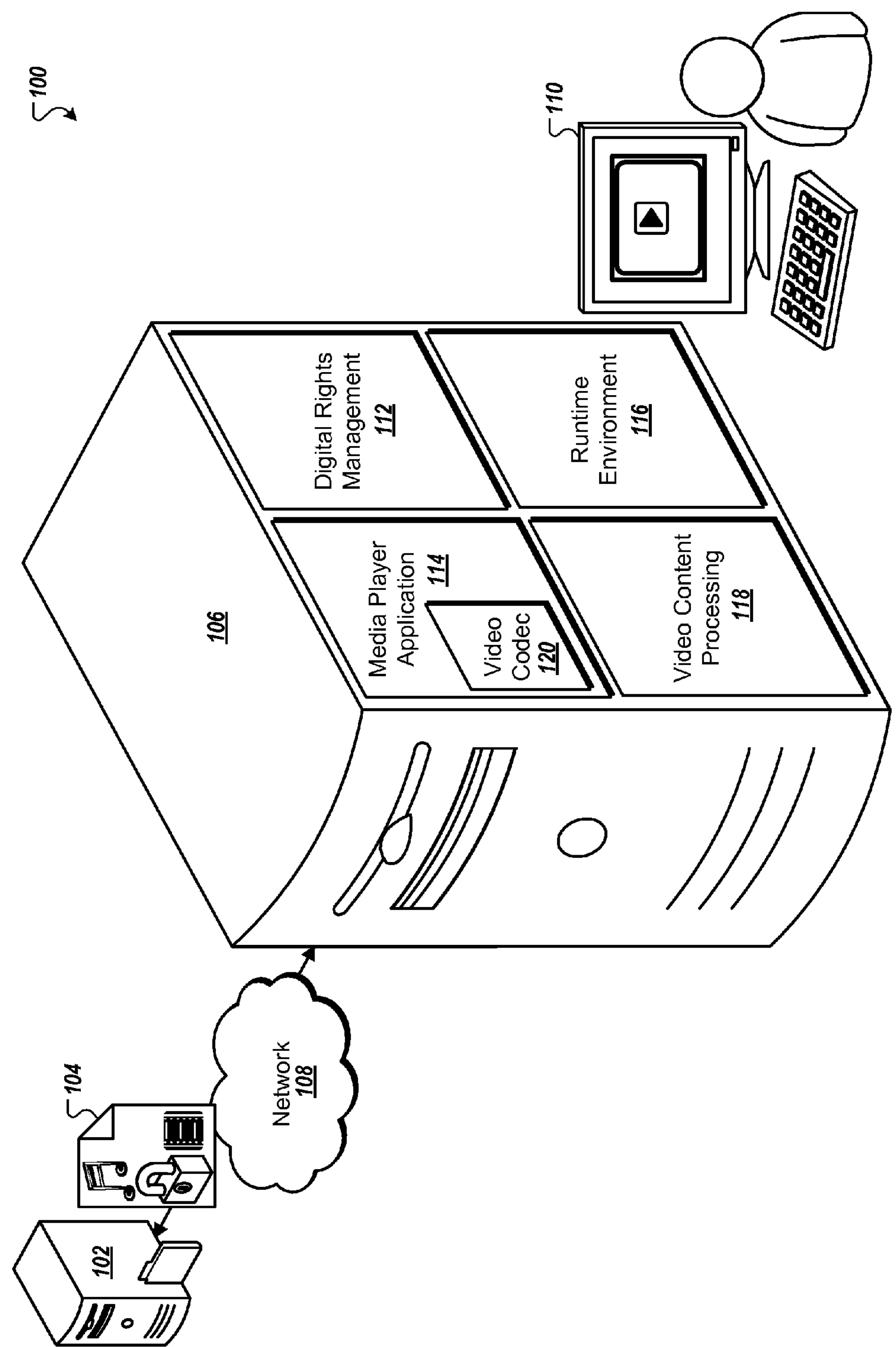
FIG. 1 is a block diagram of an example of a system for protecting video while it is decoded by a codec.

After digital rights management (DRM) encryption has been removed, and before media content has been decompressed by a media player, the media content can be vulnerable to duplication. To avoid this potential, a video content processor can apply lightweight encoding within a portion of the compressed media content conforming to a predefined video codec directly after or concurrent with DRM decryption. The encoded, compressed media content can then be passed to a media player application configured to recognize and reverse the encoding. As shown in FIG. 1, a block diagram of an example of a system 100 for protecting video while it is decoded by a codec includes a media content server 102 providing compressed, encrypted media content 104 to a computing device 106 through a network 108. Upon receipt of the compressed, encrypted media content 104, the computing device 106 can decrypt, decompress, and render the media content 104 upon a display device 110 while protecting the media content 104 from attack.

The media content 104 can include compressed video content conforming to a predefined video codec including an optional user data property such as the H.264/MPEG-4 Advanced Video Coding (AVC) codec standard or the TrueMotion VP6 video codec standard. The media content 104 can additionally be encrypted using a DRM encryption technique. In some implementations, the media content 104 can be streamed from the media content server 102 to the computing device 106 through the network 108.

The computing device 106 includes a DRM module 112 for decrypting the media content 104 and a media player application 114 for rendering the media content 106 on the display device 110. Between the decryption stage and the decompression stage, a video content processor 118 can encode a portion of the compressed media content 104. In some implementations, the DRM module 112 and the video content processing module 118 can execute within a runtime environment 116. To ensure the security of the media content 104 between the decryption stage and the encoding stage, in some implementations, the program code for both the video content processing module 118 and the DRM module 112 can be executed within an isolation environment, such as a digital sandbox.

The video content processing module 118 can apply an encoding technique to a codec-formatted compressed video content portion of the media content 104 to protect the media content 104 from unauthorized use or duplication. The encoding technique, in some implementations, includes a lightweight encoding algorithm such as a substitution box (S-Box) or Rivest Cipher 4 (RC4). The encoding technique, in some implementations, is applied to only a portion of the codec-formatted compressed video content. For example, the video content processing module 118 can apply the encoding technique to key frames within the codec-encoded compressed video content.

The video content processing module 118 can additionally introduce an extension frame (e.g., of a user data type defined by the predefined codec) into the codec-formatted compressed video content to flag the encoding technique. A media player application receiving the encoded media content 104, for example, can recognize that the media content 104 has been encoded by the presence of the extension frame or information contained therein. The extension frame, in some implementations, can include a universally unique identifier (UUID) known by the media player application.

In some implementations, the encoded compressed media content 104 can be parsed by any media player application including the codec used to format the video content. For example, although the rendered media content 104 may appear garbled, any media player application can accept the encoded compressed media content 104 and render, in encoded form, to a display, while only a media player application configured to recognize the extension frame and apply an appropriate decoding technique can render an unadulterated version of the media content 104.

In some implementations, the extension frame includes decoding information related to the encoding technique. The decoding information, in some examples, can correspond to an S-Box applied to the video content or a decoding key used to decode RC4-encoded content. The decoding information can correspond to information coded into the media player application 114, such as a reverse S-Box.

The media player application 114 can be configured to recognize the extension frame introduced by the video content processing module 118 and determine a decoding technique used to reverse the encoding applied to the video content portion of the media content 104 by the video content processing module 118. For example, the media player application 114 includes a video codec 120 corresponding to the video codec used to format the video content portion of the media content 104. In some implementations, the media player application 114 decodes the media content 104 during a decompression stage. For example, by decoding along with decompressing, the media player application 114 can avoid exposing decoded compressed media content to duplication.

In operation, the computing device 106 can receive the encrypted compressed media content 104 from the content server 102 through the network 108. The DRM module 112 can decrypt the compressed media content 104 within a secure area such as a digital sandbox of the runtime environment 116 and, while maintaining the security of the data, the video content processing module 118 can apply an encoding technique to a video content portion of the decrypted compressed media content 104 conforming to the video codec 114. The video content processing module 118 can introduce an extension frame into the video content portion of the media content 104 to flag to the media player application 114 that an encoding technique has been applied.

The video content processing module 118 can provide the encoded compressed media content 104 to the media player application 114 for rendering on the display device 110. The media player application 114 can recognize the extension frame in the video content portion of the media content 104 and apply an appropriate decoding technique to the encoded compressed video frames of the media content 104 while decompressing the media content 104. The decompressed, decoded video frames can be rendered to the display 110.

Other configurations of the system 100 are possible. The DRM module 112, in some implementations, can be included within the video content processing module 118. The video content processing module 118 and the DRM module 112, in some implementations, can be included in a separate computing device from the media player application 114. For example, a user can connect to the computing device 106 through the network 108 to have the media player application 114 or the video content processing module 118 delivered as a web service. Moreover, although the computing device 106 is shown in FIG. 1 as a personal desktop computer, the computing device 106 can be any number of computing devices, including a laptop computer, a notebook computer, a tablet computer, a smartphone, or any consumer electronics device including one or more computers to render media content.

Figure 2:
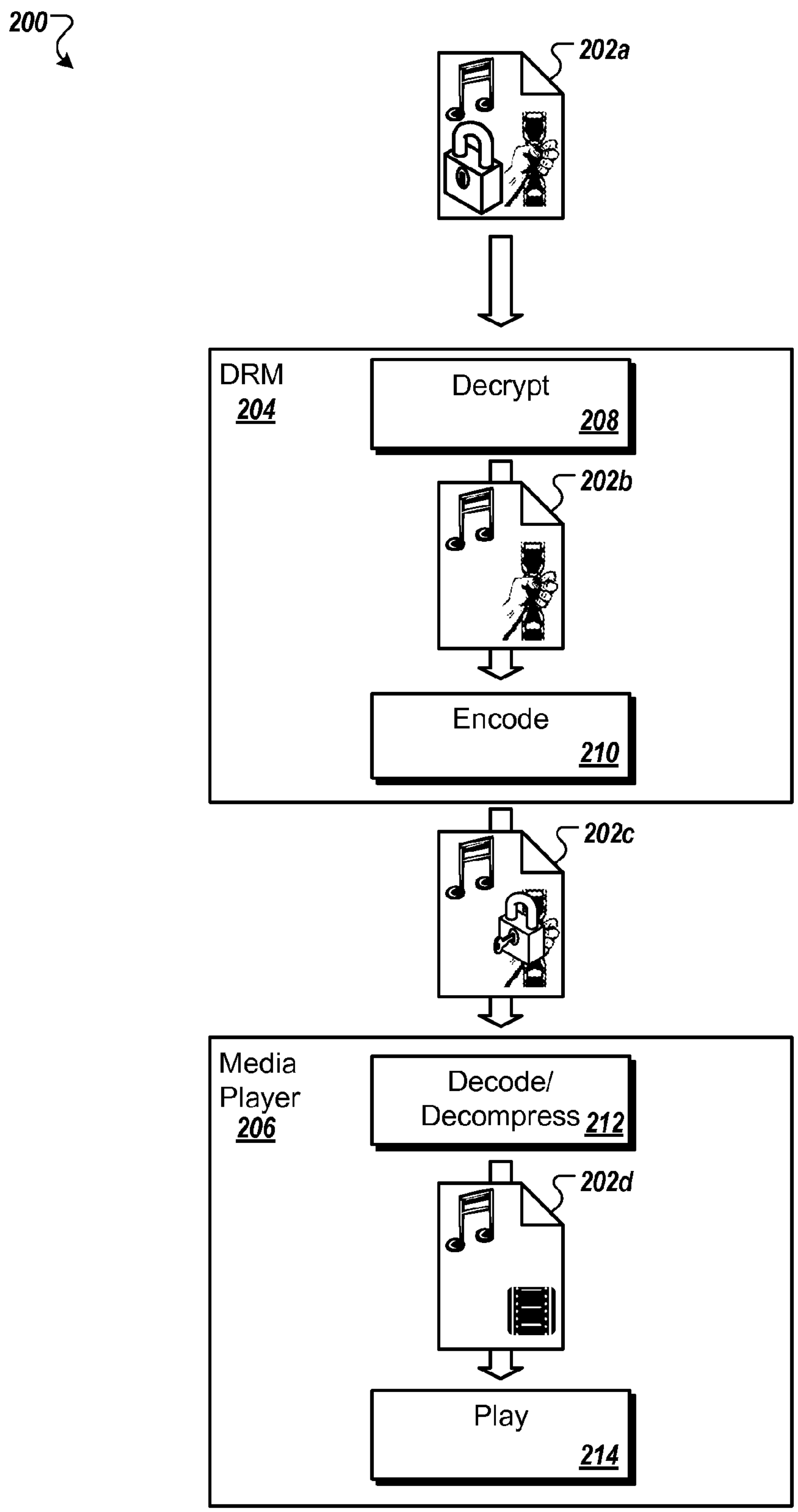
FIG. 2 is a block diagram of an example of stages for protecting video while it is decoded by a codec.

FIG. 2 is a block diagram of examples of stages 200 for protecting video while it is decoded by a codec. The stages 200 follow the flow of media content 202 as it is processed first by a DRM module 204 and next by a media player 206. This process flow, for example, can be executed on the system 100 as described in relation to FIG. 1.

The media content 202 begins as a compressed, encrypted media content 202*a* received by the DRM module 204. The DRM module applies a decryption operation 208 to the media content 202, for example removing digital rights management encryption from one or more portions of the compressed, encrypted media content 202*a*. In some implementations, the decryption operation 208 requests a key from a user prior to decrypting the media content 202*a*. A decryption key, in some implementations, can be found within the compressed, encrypted media content 202*a*. The activities of the decryption operation 208 result in a compressed, decrypted media content 202*b*.

The compressed, decrypted media content 202*b* is passed within the DRM module 204 to an encoding operation 210. The DRM module 204, for example, can provide security to the media content 202*b* when passed between the operations 208 and 210. In some implementations, an overlap between the decryption operation 208 and the encoding operation 210 can protect the compressed, decrypted media content 202*b* by ensuring that the compressed, decrypted media content 202*b* in its entirety avoids being both decrypted and without encoding. The DRM module 204, in some implementations, can execute within a secure digital resource allocation area of a runtime environment.

The encoding operation 210 applies an encoding technique to a video content portion of the compressed, decrypted media content 202*b* conforming to a predefined codec. The encoding technique can be applied within one or more video frames of the video content portion, and a user data portion inserted into the video content portion can flag the encryption technique applied.

An encoded, compressed media content 202*c* is provided to the media player application 206 from the DRM module 204. In some implementations, the DRM module 204 and the media player 206 are executing upon the same computing device. For example, both the DRM module 204 and the media player 206 can be configured to interact through a runtime environment. The media player 206 passes the encoded, compressed media content 202*c* to a decoding and decompression operation 212 to decode the encoding applied by the encoding operation 210 while decompressing the media content 202. The key for decoding, in some implementations, is included in an extension frame of the video content, inserted by the encoding operation 210. For example, the extension frame can contain a key that defines an S-Box used to decode the encoded, compressed media content 202*c*. In some implementations, the decoding algorithm is known by the media player 206, or can be derived by the media player 206 through information contained in the media content 202. For example, depending upon identifying data within the media content (e.g., title, studio, length, frame rate, etc.) a different key can be used (e.g., a different key for the movie Spider Man than for the movie Titanic). In some implementations, the key can be used as a seed to generate a reverse S-Box.

The decoding and decompression operation 212 produces a decoded, decompressed media content 202*d* which can be provided to a play operation 214. The play operation 214 can render the decoded, decompressed media content 202*d* to a display device.

Figure 3:
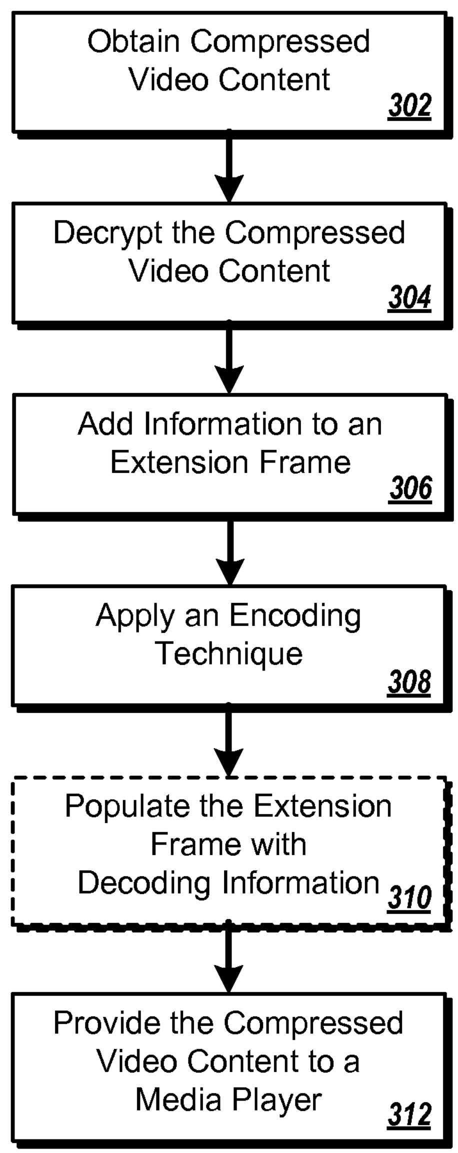
FIG. 3 is a flow chart of an example of a process for protecting video while it is decoded by a codec.

FIG. 3 is a flow chart of an example of a process 300 for protecting video while it is decoded by a codec. The process 300, for example, can be executed within a video content processing module. The process 300 includes obtaining compressed video content (302). A portion of the document structure of the compressed video content can conform to a predefined codec including a collection of video frames.

The compressed video content is decrypted in accordance with a digital rights management data encryption (304). For example, the DRM module 204, described in relation to FIG. 2, can decrypt the compressed video content.

Information is added to an extension frame of a user data type defined by the predefined codec (306). If the predefined codec conforms to a H.263 or H.264 standard, for example, the extension frame can be a supplemental enhanced information (SEI) network abstraction layer (NAL) unit. If the predefined codec conforms to a VP6 standard, the extension frame can be a control buffer appended to the end of a video buffer. In some implementations, the extension frame is already included in the compressed video content. In some VP6 implementations, after a VP6 decoder parses and decodes an encoded VP6 sample, the parser's file pointer will stop at the end, allowing injection of the information without storing any additional metadata. In some implementations, the extension frame can be introduced by the process 300, and identification information, such as a UUID, can be added to the extension frame.

An encoding technique is applied to one or more of the collection of video frames after decryption (308). The encoding technique can include a data scrambling technique. The encoding technique can be applied to one or more key frames within the collection of video frames. In some implementations, the encoding technique can be applied to other types of frames as well such as, in some examples, inter-frames (I-frames), predictive frames (P-frames), or bi-directional predictive frames (B-frames). If the predefined codec conforms to a H.263 or H.264 standard, the encoding technique can be applied to one or more network abstraction layer (NAL) units of the compressed video content. If the predefined codec conforms to a VP6 standard, the encoding technique can be applied to one or more samples of the compressed video content. In some implementations, a dynamic S-Box can be derived during execution of the process 300, based upon an initial permutation and a key generated from information contained within the video content. A static S-Box can be applied, in some implementations, as an encoding technique.

The extension frame can flag that the encoding technique has been applied. In some implementations, the extension frame is populated with decoding information related to the encoding technique (310). The decoding information, for example, can include a decoding key which can be applied to decode the encoding technique. The decoding key can correspond to an S-Box applied to the one or more video frames. For example, a media player configured to recognize the decoding key can include a number of static reverse S-Boxes, and the decoding key can indicate which of the reverse S-Boxes decodes the S-Box encoding applied to the compressed video content.

The compressed video content is provided to a media player including a codec conforming to the predefined codec (312). The media player can recognize the extension frame and apply a decoding technique to the compressed video content based upon the extension frame and, optionally, information included therein. The media player can then render the media content to a display device.

Figure 4:
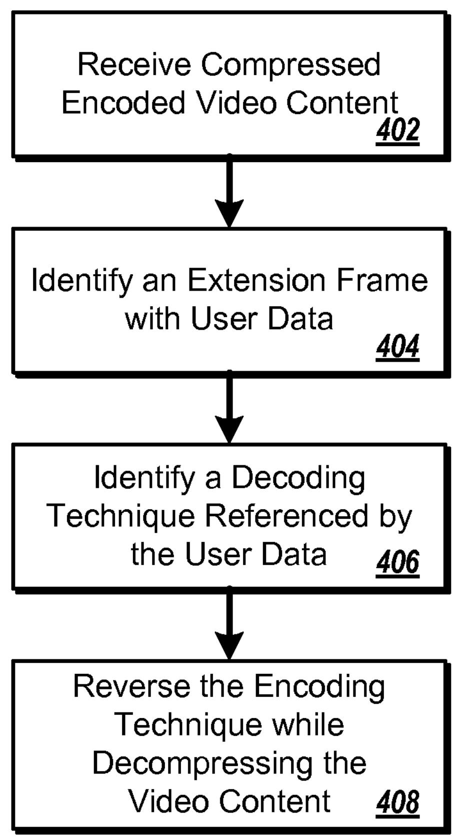
FIG. 4 is a flow chart of another example of a process for protecting video while it is decoded by a codec.

FIG. 4 is a flow chart of another example of a process 400 for protecting video while it is decoded by a codec. The process 400, for example, can be executed by a media player application.

The process 400 begins with receiving compressed encoded video content including a collection of video frames conforming to a predefined video codec having an associated optional user data property (402). The compressed encoded video content, for example, can be provided by a DRM module.

An extension frame is identified within a user data portion (404). The extension frame, for example, can correspond with an extension frame inserted by an encoding operation, such as the encoding operation 210 described in relation to FIG. 2.

A decoding technique referenced by the user data is identified (406). For example, the existence of the user data, or a UUID component of the user data portion, can flag that the compressed video content has been encoded. In some implementations, the user data further includes a decoding key. The decoding key, for example, can be used to explode an S-Box or to decode RC4 encoding.

The encoding technique is reversed while the video content is decompressed (408). By maintaining a close relationship between the decoding and decompression operations, exposure of decoded, compressed media content can be avoided. The decoded and decompressed media content, for example, can be provided by a media player application for rendering upon a display device. In some implementations, the process 400 can be executed by a media player application.

Figure 5A:
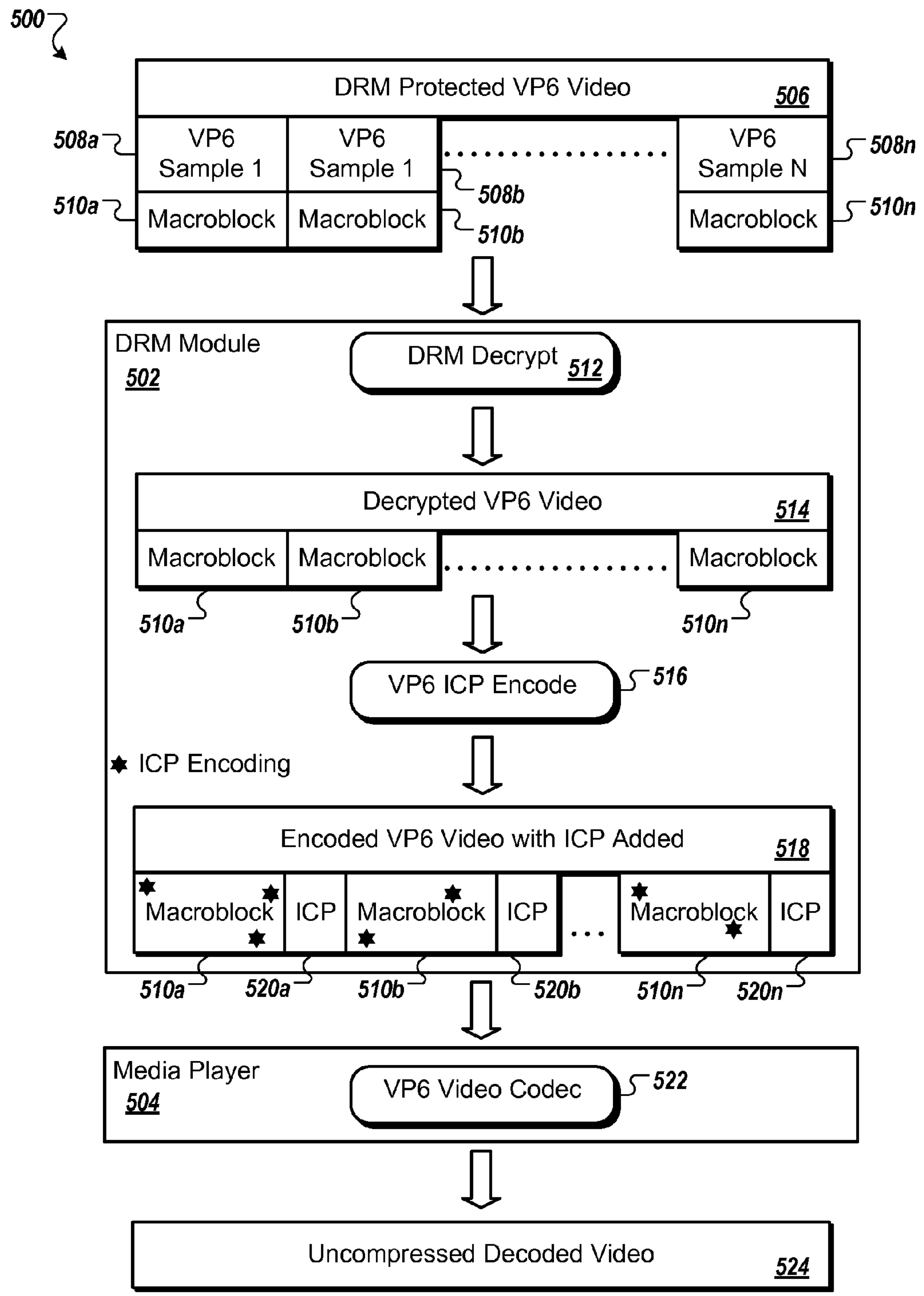
FIGS. 5A and 5B are block diagrams of examples of stages for protecting video while it is decoded using a particular codec.
Figure 5B:
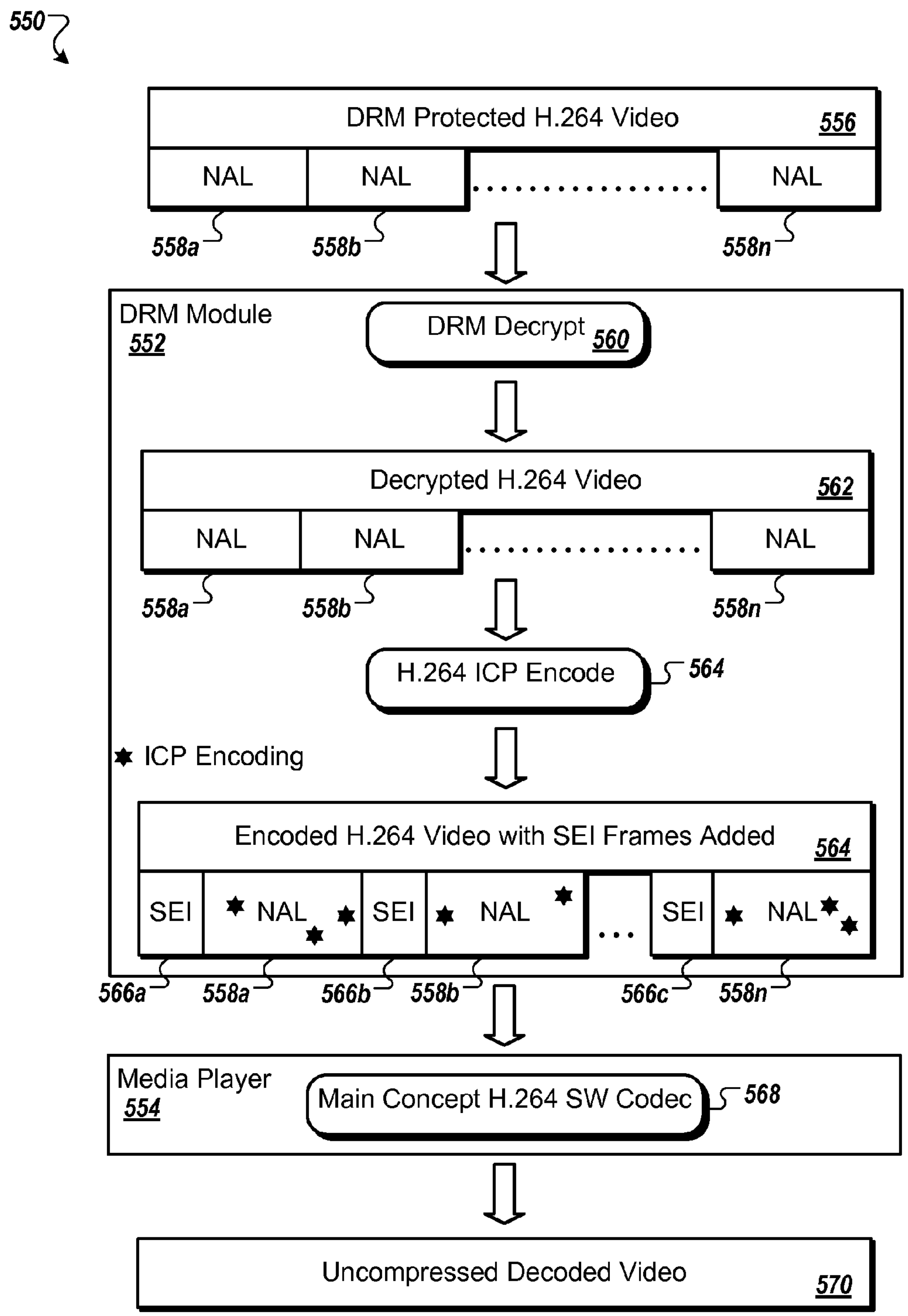

FIGS. 5A and 5B are block diagrams of examples of stages for protecting video while it is decoded using a particular codec. The flow of the stages, for example, follows the general flow described in relation to FIG. 2, while providing details regarding example implementations using the VP6 video codec (FIG. 5A) and the H.264 video codec (FIG. 5B).

As shown in FIG. 5A, stages 500 portray the flow of VP6 video content through a DRM module 502 and a media player application 504. The flow begins by receiving a DRM-protected VP6 video content 506. The DRM-protected VP6 video content 506, for example, can be a portion of a media content. The DRM-protected VP6 video content 506 includes a collection of VP6 samples 508 containing data that encodes a set of macroblocks 510. Each VP6 sample 508 corresponds to a discrete video frame, including a still image. VP6 video compression separates video frames, or samples, into square groups of neighboring pixels, called macroblocks. For example, the VP6 video codec uses a sixteen-by-sixteen pixel macroblock.

The DRM-protected VP6 video content 506 is provided to the DRM module 502, where a DRM decryption operation 512 decrypts the DRM encryption applied to the DRM-protected VP6 video content 506. Upon decryption, a decrypted VP6 video content 514, including the macroblocks 510 from the samples 508, is passed to a VP6 Internal Content Protection (ICP) encoding operation 516 for internal encoding. For example, the VP6 ICP encoding operation 516 can apply encoding to one or more of the macroblocks 510, for example macroblocks from samples associated with key frames of the decrypted VP6 video content 514. Note that the encoding operation 516 can be applied on a sample level, rather than between boundaries of individual macroblocks from a given sample.

Additionally, the VP6 ICP encoding operation 516 can append an arbitrary-length buffer to the decrypted VP6 video content 514 to flag the encoding operation applied to the decrypted VP6 video content 514. Because the VP6 video codec depends upon sixteen-by-sixteen pixel macroblocks, any data not matching that format is ignored by the codec upon rendering. In this manner, even after appending information to the decrypted VP6 video content 514, any media player application including the VP6 codec can render the encoded VP6 video content, albeit in a corrupted state due to the encoding within the one or more macroblocks 510. The appended buffer, in some implementations, can include a decoding key.

As shown, the VP6 ICP encoding operation 516 produces an encoded VP6 video content 518 with one or more added ICP buffers 520. In some implementations, each sample's macroblocks can be encoded and have an associated ICP buffer. Alternatively, only keyframe samples need have their macroblocks encoded. In some implementations, the encoding operation 516 can be applied uniformly throughout the macroblocks 510 of the video content 518, in which case there need only be one ICP buffer, such as when the ICP buffer 520*a* is included with only the first set of macroblocks 510*a* of the encoded VP6 video content 518. By providing the ICP buffer 520*a* early within the encoded VP6 video content 518, the media player 504 can quickly recognize the encoding applied to the encoded VP6 video content 518, without having to receive the entire encoded VP6 video content 518. Alternatively, the encoding operation 516 can be applied differently throughout the macroblocks 510 of the video content 518, in which case each distinct region of encoding in the video content 518 can have it associated ICP buffer 520 that indicates how to decode that region. In some implementations, the ICP buffer 520*a* can include information pertaining to which macroblocks 510, in a detectable pattern (e.g., all key frames) are encoded, wherein the media player application 504 can decode the encoded VP6 video content 518 without having to encounter further ICP buffers.

In some implementations, each of the ICP buffers 520*a*, 520*b*, and 520*n* are of the same size and contain the same information. For example, the same UUID, key, or other decoding technique information can be embedded within every ICP buffer 520. The first ICP buffer 520*a*, in some implementations, can be larger than the remaining ICP buffers 520*b* through 520*n*, because only the first ICP buffer 520*a* includes decoding technique information. The remaining ICP buffers 520*b* through 520*n*, for example, can include flags recognizable by the media player 504. When locating the ICP buffers 520*b*, for example, the media player 504 can apply the decoding technique provided within the first ICP buffer 520*a* to the associated macroblocks 510*b*.

As illustrated in each of the macroblocks of the encoded VP6 video content 518, encoding (represented by a star shape) can be scattered randomly throughout each sample of macroblocks 510. The pattern of the applied encoding, in some implementations, depends in part upon the type of encoding technique applied by the VP6 IPC encoding operation 516.

The encoded VP6 video content 518 is provided to the media player 504 which is configured to recognize the ICP buffers 520, determine an appropriate decoding technique to reverse the encoding applied by the VP6 ICP encoding operation 516, and decompress the VP6 codec formatting using a modified version of a VP6 video codec 522. By embedding this functionality directly within the VP6 video codec 522, for example, the DRM module 502 can avoid producing a compressed, decoded version of the encoded VP6 video content 518, thereby protecting the encoded VP6 video content 518 from potential attack.

The media player 504 produces an uncompressed, decoded video content 524 which can be rendered to a display. In some implementations, an uncompressed, decoded portion of video content 524 is rendered to the display of a user device while a remaining portion of the video content continues to undergo the encoding process.

As shown in FIG. 5B, stages 550 portray the flow of H.264 video content through a DRM module 552 and a media player application 554. The flow begins by receiving a DRM-protected H.264 video content 556. All data packaged in an H.264 video content is divided into Network Abstraction Layer (NAL) units such as a collection of NAL units 558. However, the stages 550 illustrate operations specifically affecting a video (e.g., visual as opposed to audio or control) portion of H.264 video content. The video portion of H.264 video content can be separated into video slices, each NAL unit describing a section of a particular video slice.

The DRM-protected H.264 video content 556 is provided to the DRM module 552, where a DRM decryption operation 560 can decrypt the DRM encryption applied to the DRM-protected VP6 video content 556. Upon decryption, a decrypted H.264 video content 562, including the NAL units 558, is passed to a H.264 ICP encoding operation 564 for internal encoding. For example, the H.264 ICP encoding operation 564 can apply encoding to one or more of the NAL units 558, for example NAL units associated with key frames of the decrypted H.264 video content 562.

Additionally, the H.264 ICP encoding operation 564 can prepend one or more Supplemental Enhancement Information (SEI) content blocks 566 to the decrypted H.264 video content 562 to flag the encoding operation applied to the decrypted H.264 video content 562. The H.264 video codec provides for SEI content blocks to transport user-specific data. Any media player application including the H.264 codec can render H.264 video content including SEI content blocks, but only a media player configured to recognize the contents of the SEI content blocks 566 inserted by the H.264 ICP encoding operation 564 could decode the NAL units 558 and render the video content uncorrupted. One or more of the SEI content blocks 566, in some implementations, can include a decoding key. The decoding key, for example, can indicate a reverse S-Box coded in the media player application 554. Similar to the discussion relating to the ICP buffer 520, as described in FIG. 5A, one or more SEI content blocks 566 can be inserted by the H.264 ICP encoding operation 564, and the contents of each of the SEI content blocks 566 may vary.

The H.264 ICP encoding operation 564 outputs an encoded H.264 video content 564, including the SEI content blocks 566. As illustrated in each of the NAL units 558 of the encoded H.264 video content 564, encoding (represented by a star shape) can be scattered randomly throughout each NAL unit 558. The pattern of the applied encoding, in some implementations, depends in part upon the type of encoding technique applied by the H.264 ICP encoding operation 564.

The encoded H.264 video content 564 is provided to the media player 554 which is configured to recognize the SEI content blocks 566, determine an appropriate decoding technique to reverse the encoding applied by the H.264 ICP encoding operation 564, and decompress the H.264 codec formatting using a modified version of a H.264 video codec 568. The media player application 554, for example, can include one or more embedded reverse S-Box definitions (e.g., identified using a decoding key). In some implementations, the media player 554 generates a dynamic reverse S-Box based upon a provided encoding key and an initial permutation, for example based upon an encoded derivation algorithm.

In some implementations, one or more NAL units 558 include different encryption techniques. For example, every third encrypted NAL unit 558 (e.g., as flagged by an SEI content block 566) can be decrypted using a dynamic reverse S-Box, while every first encrypted NAL unit 558 can be decrypted using a first static reverse S-Box, and every second encrypted NAL unit 558 can be decrypted using a second static reverse S-Box.

The media player 554 produces an uncompressed, decoded video content 570 which can be rendered to a display. In some implementations, an uncompressed, decoded portion of video content 524 is rendered to the display of a user device while a remaining portion of the video content continues to undergo the encoding process.

Figure 5C:
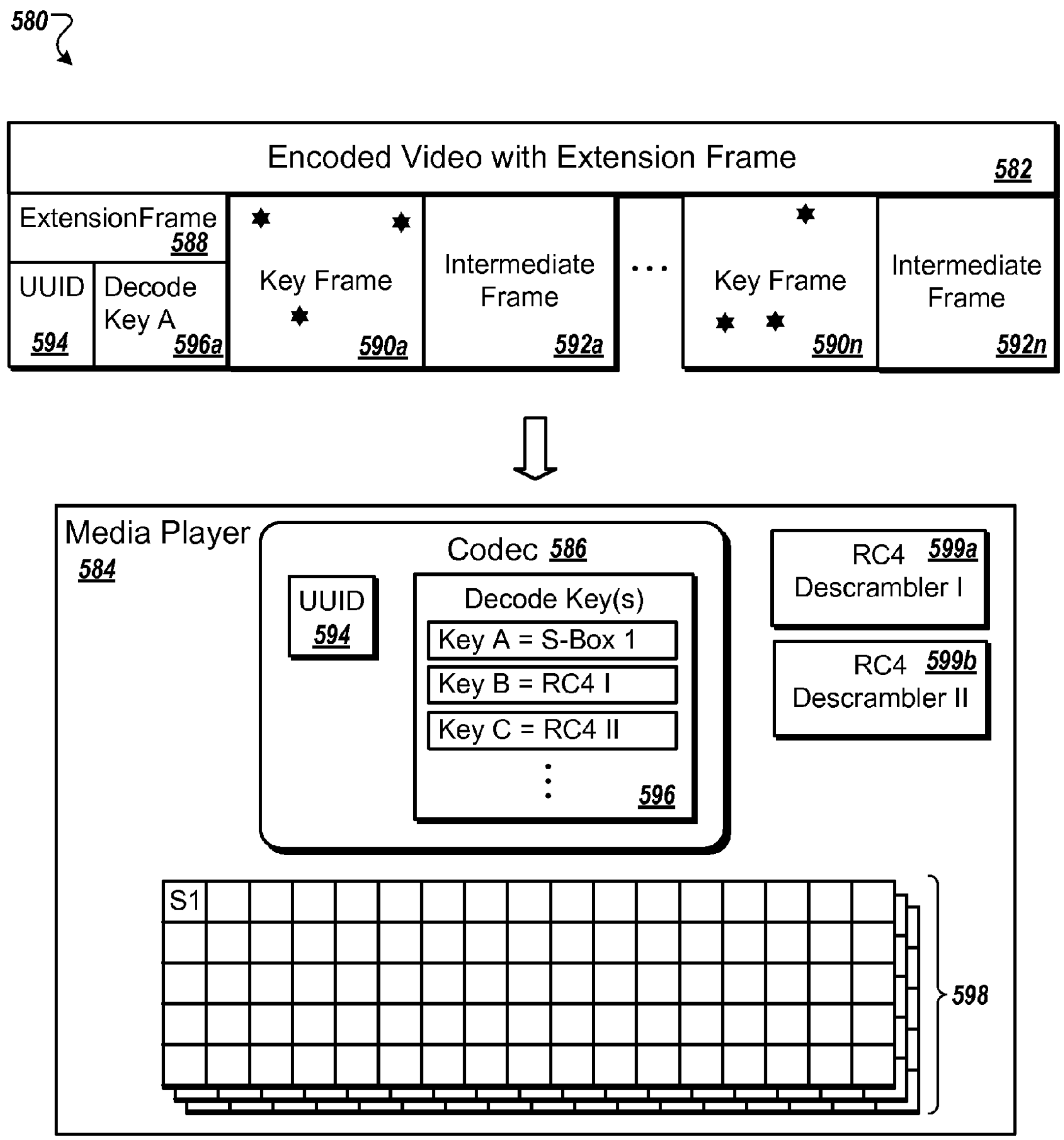
FIG. 5C is a block diagram of an example of a system for receiving encoded video content at a media player application.

FIG. 5C is a block diagram of an example of a system 580 for receiving encoded video content 582 at a media player application 584. The media player application 584 includes a codec 586 configured to recognize a UUID 594 in an extension frame 588 of the encoded video content 582 and to apply a decoding mechanism to the encoded video content 582 related to a decoding key 596 also included in the extension frame 588.

The encoded video content 582 presented to the media player application 584 includes the extension frame 588, a series of key frames 590 as well as a series of intermediate frames 592. As indicated, only the key frames 590 include encoding, represented by star shapes. In other implementations, the encoding can be included in more than one type of video frame.

The media player application 584 can cross-reference a decoding key A **596*a* within the extension frame 588 with a set of decoding keys 596 within the codec 596 to determine a decoding mechanism to reverse the encoding applied to the key frames 590. In some examples, the decoding key 596 can include a static substitution box, such as a set of substitution boxes 598, an RC4 descrambling code 599, or a dynamic S-box (not illustrated) which can be dynamically expanded based in part upon information in the encoded video content 582. Using the determined decoding mechanism, the media player application 584 can reverse the encoding applied to the encoded video content 582 while decompressing the encoded video content 582** for presentation to a display.

Figure 6:
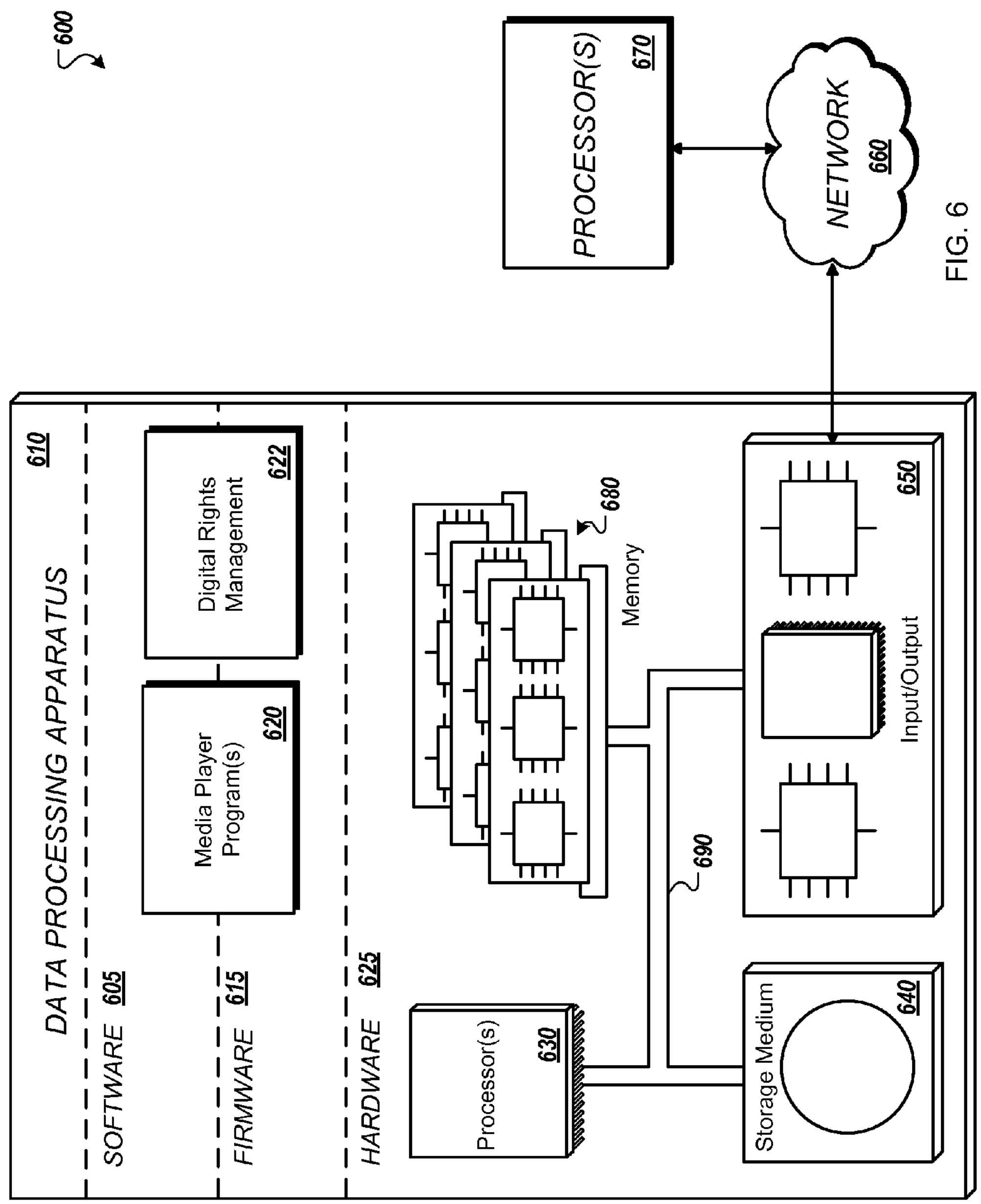
FIG. 6 is a block diagram of an example of an apparatus for protecting video while it is decoded by a codec.

FIG. 6 is a block diagram of an example of an apparatus 600 for protecting video while it is decoded by a codec. A data processing apparatus 610 can include hardware 625, firmware 615 and software 605, and can include one or more media player program(s) 620 and a DRM module 622 operating in conjunction with the data processing apparatus 610 to effect various operations described in this specification. The media player program(s) 620 and DRM module 622, in combination with the various hardware 625, firmware 615, and software 605 components of the data processing apparatus 610, represent one or more structural components in the system 600, in which the algorithms described herein can be embodied.

The media player program(s) 620 can be one or more applications for inputting, processing, and/or outputting media content (e.g., audio, video, graphical, and/or textual data). The media player program(s) 620 can input media information from the DRM module 622 or remotely through a network 660. The media player program(s) 620 can output media information to one or more output devices such as a display device and, optionally, one or more speakers. An application refers to a computer program that the user perceives as a distinct computer tool used for a defined purpose. An application can be built entirely into an operating system or other operating environment, or it can have different components in different locations (e.g., a remote server). The media player program(s) 620 can include or interface with other software. The media player program(s) 620 can include a stand alone media player program, a media player program that relies on a runtime environment to operate (e.g., a JAVA® virtual machine or an Adobe AIR® runtime environment), or multiple different media player programs, which can be stand alone, browser-based, or runtime environment-based, in some examples.

Interface software can also be included that operates over the network 660 to interface with other processor(s) 670, such as in a media server communicating with the data processing apparatus 610 to provide streaming media content. For example, the DRM 622 can include software methods for decrypting video content received over the network 660, and immediately encoding the same video content within a video codec portion.

The hardware level 625 of the data processing apparatus 610 includes one or more processors 630, a memory 680, and at least one computer-readable medium 640 (e.g., random access memory, storage device, etc.). The hardware level 625 can also include one or more input/output devices 650, including one or more user interface devices.

Each of the components 630, 640, 650, and 680 are interconnected using a system bus 690. The processor(s) 630 can process instructions for execution within the system 600. In some implementations, one or more single-threaded processors can be included within the processor(s) 630. In other implementations, one or more multi-threaded processors can be included within the processor(s) 630. In some implementations, the processor(s) 630 can process instructions stored in the memory 680, or on the storage device 640, to display graphical information on a display device.

The memory 680 can be a computer-readable medium used to store information within the system 600 and can include a volatile memory unit, a non-volatile memory unit, or both. The storage device 640 can provide mass storage for the system 600. The storage device 640 can include a floppy disk device, a hard disk device, an optical disk device, or a tape device.

The input/output devices 650 provide input/output operations for the system 600. The input/output devices 650 can include a keyboard, mouse, stylus or pointing device, a display unit for displaying graphical user interfaces such as a display device, a modem or other networking hardware/firmware, or any combination thereof to name a few examples.

The subject matter described in this specification can also be used in conjunction with other input/output devices, such as a printer or scanner. An input/output device can be used to connect to the network 660, and can furthermore connect to one or more processors 670 via the network 660 (e.g., the Internet).

Therefore, a user of the media player program(s) 620 or DRM module 622 does not need to be local, and may be connecting in a wired or wireless fashion using an internet or intranet connection on a personal computer, personal digital assistant (PDA), smartphone (e.g., a cellular phone including an operating system and advanced computing capabilities), or using other suitable hardware and software at a remote location. For example, a user can access a web interface via the remote processor 670 in order to engage in a video viewing session. In any event, data can be transmitted over the network 660 to/from the data processing apparatus 610. Note that the data processing apparatus 610 can itself be considered a user interface device (e.g., when the media player program(s) 620 or the DRM module 622 is delivered by a remote server as a web service).

The system 600 can be used to protect video content conforming to a predefined codec by encoding a portion of the video data structured within the codec format immediately after decrypting a digital rights management protection applied to the video content and passing the encoded video content to a media player program configured to recognize and reverse the encoding while decompressing the codec formatted data. For example, the DRM module 622 can receive media content from the processor(s) 670 through the network 660, remove a DRM encryption applied to the media content, and apply an encoding technique to a video content portion of the media content, formatted to conform with a predefined codec. The decryption and encoding operations performed by the DRM module 622, in some implementations, can be executed within a protected resource allocation area of the memory 680, for example provided by an underlying runtime environment.

The DRM module 622 can supply the media player program(s) 620 with the media content. The media player program(s) 620 can recognize the encoding technique applied to the media content and decode the video content portion while decompressing the media content, using a modified version of the predefined codec including operations for locating an extension frame inserted by the DRM module 622 and, optionally, recognizing encoding information included therein.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

obtaining compressed video content within a video content processing module, a portion of a document structure of the compressed video content conforming to a predefined codec, the portion of the document structure including a plurality of video frames;

decrypting the compressed video content in accordance with a digital rights management data encryption;

adding information in an extension frame associated with the portion of the document structure, the adding comprising adding information to identify a decoding technique usable to reverse an encoding technique;

applying the encoding technique to content of one or more key frames of the plurality of video frames after the decrypting; and providing the compressed video content, including the encoded content, to a media player including a codec conforming to the predefined codec to allow the media player to (i) identify the decoding technique based on the identifying information added to the extension frame, and (ii) reverse the encoding technique applied to the content of the one or more key frames while decompressing the compressed video content.

2. The method of claim 1, further comprising:

wherein adding information in an extension frame comprises introducing the extension frame into the portion of the document structure.

3. The method of claim 1, where the media player recognizes the extension frame and applies the decoding technique to the compressed video content within a decompression stage based upon the extension frame.

4. The method of claim 1, further comprising:

populating the extension frame with decoding information related to the encoding technique.

5. The method of claim 4, where the decoding information includes a decoding key which can be applied by the media player to decode the encoding technique applied to the compressed video content.

6. The method of claim 4, where the decoding information corresponds to a substitution box applied to the one or more of the plurality of video frames.

7. The method of claim 1, where the encoding technique is a data scrambling technique.

8. The method of claim 1, where the encoding technique is applied to only the one or more key frames of the plurality of video frames.

9. The method of claim 1, where the predefined codec conforms to a H.263 or H.264 standard, the plurality of video frames are network abstraction layer (NAL) units, and the extension frame is a supplemental enhanced information (SEI) NAL unit.

10. The method of claim 9, where the SEI NAL unit includes a universally unique identifier (UUID) known by the media player.

11. The method of claim 1, where
the predefined codec conforms to a VP6 standard,
the plurality of video frames are VP6-compliant samples, and
the extension frame is a control buffer appended to the end of a video buffer.

12. A system comprising:
a display device;
a computer storage medium; and
one or more processors operable to interact with the computer storage medium and the display device and to perform operations comprising:
receiving, at a digital rights management module, encrypted compressed video content, where
a portion of the encrypted compressed video content conforms to a predefined video codec having an associated optional property, the portion including a plurality of video frames, and where
video content including the optional property is readable by any media player including a codec conforming to the predefined video codec;
decrypting the compressed video content;
modifying, using a video content processing module, the decrypted compressed video content, where the video content processing module
adds information in an extension frame in the portion,
applies an encoding technique to only content of one or more key frames of the plurality of video frames, and
identifies a decoding technique within the extension frame by adding a decoding key to the extension frame, the decoding technique usable to reverse the applied encoding technique; and
identifying, at a media player, the identified decoding technique based on the decoding key within the extension frame of the compressed video content, where the media player reverses the encoding technique applied to the compressed video content while decompressing the compressed video content.

13. The system of claim 12, where the video content processing module populates the extension frame with decoding information related to the encoding technique.

14. The system of claim 13, where the decoding information corresponds to a substitution box applied to the one or more of the plurality of video frames.

15. The system of claim 12, where the predefined codec conforms to at least one of a H.263 standard, a H.264 standard, and a VP6 standard.

16. A non-transitory computer-readable medium encoding a computer program product operable to cause data processing apparatus to perform operations comprising:
obtaining compressed video content within a video content processing module, a portion of a document structure of the compressed video content conforming to a predefined codec, the portion of the document structure including a plurality of video frames;
decrypting the compressed video content in accordance with a digital rights management data encryption;
adding information in an extension frame associated with the portion of the document structure, the adding comprising adding information to identify a decoding technique usable to reverse an encoding technique;
applying the encoding technique to content of one or more key frames of the plurality of video frames after the decrypting; and
providing the compressed video content, including the encoded content, to a media player including a codec conforming to the predefined codec to allow the media player to (i) identify the decoding technique based on the identifying information added to the extension frame, and (ii) reverse the encoding technique applied to the content of the one or more key frames while decompressing the compressed video content.

17. The computer-readable medium of claim 16, where the media player recognizes the extension frame and applies the decoding technique to the compressed video content within a decompression stage based upon the extension frame.

18. The computer-readable medium of claim 16, where the operations further comprise:
populating the extension frame with decoding information related to the encoding technique.

19. The computer-readable medium of claim 18, where the decoding information includes a decoding key which can be applied by the media player to decode the encoding technique applied to the compressed video content.

20. The computer-readable medium of claim 16, where the encoding technique is a data scrambling technique.

* * * * *